(12) United States Patent
Imai et al.

(10) Patent No.: US 11,926,088 B2
(45) Date of Patent: Mar. 12, 2024

(54) PREPREG, PREFORM, FIBER-REINFORCED COMPOSITE MATERIAL, AND METHOD FOR PRODUCING SAID PREPREG, SAID PREFORM OR SAID FIBER-REINFORCED COMPOSITE MATERIAL

(71) Applicant: Toray Industries, Inc., Tokyo (JP)

(72) Inventors: Naokichi Imai, Ehime (JP); Kotaro Shinohara, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/778,077

(22) PCT Filed: Nov. 16, 2020

(86) PCT No.: PCT/JP2020/042588
§ 371 (c)(1),
(2) Date: May 19, 2022

(87) PCT Pub. No.: WO2021/106651
PCT Pub. Date: Jun. 3, 2021

(65) Prior Publication Data
US 2022/0410465 A1 Dec. 29, 2022

(30) Foreign Application Priority Data

Nov. 29, 2019 (JP) .................................. 2019-216113

(51) Int. Cl.
*B29C 53/24* (2006.01)
*B29C 70/34* (2006.01)
(Continued)

(52) U.S. Cl.
CPC ............. *B29C 53/24* (2013.01); *B29C 70/34* (2013.01); *B29C 70/54* (2013.01); *B32B 3/28* (2013.01);
(Continued)

(58) Field of Classification Search
CPC ............... B32B 3/28; B32B 2260/046; B32B 2305/026; B32B 2305/076;
(Continued)

(56) References Cited

U.S. PATENT DOCUMENTS 6,935,997 B2 * 8/2005 Kling ...................... G06T 17/20
493/356
2010/0048078 A1 2/2010 Kehrle et al.
(Continued)

FOREIGN PATENT DOCUMENTS

JP 5743833 A 3/1982
JP 57102536 U 6/1982
(Continued)

OTHER PUBLICATIONS

International Search Report and Written Opinion for International Application No. PCT/JP2020/042588, dated Jan. 26, 2021, 5 pages.
(Continued)

*Primary Examiner* — Jasper Saberi
(74) *Attorney, Agent, or Firm* — Buchanan Ingersoll & Rooney PC

(57) ABSTRACT

An object of the present invention is to provide a fiber-reinforced composite material achieving both lightweight properties and mechanical properties, a laminate thereof, and a prepreg capable of easily molding a sandwich structure thereof. The present invention is a prepreg comprising a reinforced fiber substrate (B) impregnated with a resin (A), wherein the reinforced fiber substrate (B) exists in a folded state having a plurality of folds with a fold angle of 0° or more and less than 90° in the prepreg.

18 Claims, 5 Drawing Sheets

(51) Int. Cl.
    *B29C 70/54*     (2006.01)
    *B32B 3/28*     (2006.01)
    *B32B 5/02*     (2006.01)
    *B29K 105/00*     (2006.01)
    *B29K 105/12*     (2006.01)
    *B29K 105/24*     (2006.01)
    *B29L 7/00*     (2006.01)

(52) U.S. Cl.
    CPC ........ B32B 5/022 (2013.01); *B29K 2105/128* (2013.01); *B29K 2105/24* (2013.01); *B29K 2105/256* (2013.01); *B29L 2007/002* (2013.01); *B32B 2250/20* (2013.01); *B32B 2260/021* (2013.01); *B32B 2305/076* (2013.01); *B32B 2307/732* (2013.01)

(58) Field of Classification Search
    CPC . B32B 2260/021; B32B 3/30; B29D 99/0089; B29C 70/14; B29C 53/24; B29C 70/34; B29C 70/54
    See application file for complete search history.

(56) References Cited

U.S. PATENT DOCUMENTS

| | | | |
|---|---|---|---|
| 2011/0281080 A1* | 11/2011 | Levit | D21H 27/22 428/174 |
| 2014/0265043 A1* | 9/2014 | Oldroyd | B29D 99/0089 425/162 |
| 2015/0266260 A1* | 9/2015 | Fujioka | B32B 3/26 428/116 |
| 2016/0059513 A1* | 3/2016 | Hollander | B32B 5/024 700/98 |
| 2018/0186134 A1* | 7/2018 | Imai | C08J 5/04 |
| 2020/0039111 A1* | 2/2020 | Tsumura | B29B 11/16 |
| 2020/0171763 A1* | 6/2020 | Escowitz | B29C 70/465 |
| 2020/0307148 A1 | 10/2020 | Takebe et al. | |

FOREIGN PATENT DOCUMENTS

| | | |
|---|---|---|
| JP | 2012500864 A | 1/2012 |
| JP | 2013511629 A | 4/2013 |
| WO | 2018117181 A1 | 6/2018 |
| WO | 2018147324 A1 | 8/2018 |

OTHER PUBLICATIONS

Extended European Search Report for European Application No. 20891920.9, dated Nov. 10, 2023, 12 pages.

* cited by examiner

PREPREG, PREFORM, FIBER-REINFORCED COMPOSITE MATERIAL, AND METHOD FOR PRODUCING SAID PREPREG, SAID PREFORM OR SAID FIBER-REINFORCED COMPOSITE MATERIAL

CROSS REFERENCE TO RELATED APPLICATIONS

This is the U.S. National Phase application of PCT/JP2020/042588, filed Nov. 16, 2020 which claims priority to Japanese Patent Application No. 2019-216113, filed Nov. 29, 2019, the disclosures of each of these applications being incorporated herein by reference in their entireties for all purposes.

FIELD OF THE INVENTION

The present invention relates to a fiber-reinforced composite material achieving both lightweight properties and mechanical properties, and a prepreg for forming the fiber-reinforced composite material.

BACKGROUND OF THE INVENTION

A fiber-reinforced composite material obtained by using a thermosetting resin or a thermoplastic resin as a matrix and combining with a reinforcing fiber such as a carbon fiber or a glass fiber has excellent mechanical properties such as strength and rigidity, flame retardancy, and corrosion resistance while being lightweight, and has been thus applied to many fields such as aerospace, automobile, railway vehicle, ship, civil engineering and construction, electronic equipment, industrial machinery, and sports goods. Whereas, from the viewpoint of improvement in fuel efficiency and portability, further weight reduction has been required for members and housings, and porous fiber-reinforced composite materials with pores formed have also been developed. However, such a porous fiber-reinforced composite material is problematic in that mechanical properties are dramatically deteriorated as the ratio of pores is increased for the purpose of weight reduction. Therefore, there has been a demand for a technique for both reduction in the weight of a fiber-reinforced composite material and mechanical properties.

Patent Document 1 discloses a composite structure having reinforcing fibers, a resin, and pores, and having a protrusion for reinforcement as a technique for achieving both weight reduction and mechanical properties of a fiber-reinforced composite material. Patent Document 2 discloses a core structure composed of a cured resin and a nonwoven sheet and having a zigzag cross section. Patent Document 3 discloses a structure composed of paper including carbon fibers having cross-sections with different diameters, and a core structure obtained by folding the structure so as to form a zigzag cross section.

PATENT DOCUMENTS

Patent Document 1: WO 2018/117181 A
Patent Document 2: Japanese Patent Laid-open Publication No. 2012-500864
Patent Document 3: Japanese Patent Laid-open Publication No. 2013-511629

SUMMARY OF THE INVENTION

Patent Document 1 is a technique for reducing weight by increasing the total amount of fine pores, and is problematic in that deterioration of mechanical properties is significant due to weight reduction. In the above document, a reinforcing structure such as a rib or a boss is adopted; however, this is a reinforcing structure disposed on the surface of the composite structure, and thus has problems of requiring a specific molding die and thickness reduction. In the methods described in Patent Document 2 and Patent Document 3, the resin is impregnated without controlling the size and amount of the pores, and furthermore, in the zigzag-shaped structure, the zigzag-shaped structure is easily opened by the load in the bending direction, and is insufficient to achieve both weight reduction and mechanical properties. An object of the present invention is to provide a fiber-reinforced composite material having both lightweight properties and mechanical properties.

The present invention according to various embodiments for solving such a problem is: a prepreg including a reinforced fiber substrate (B) impregnated with a resin (A), wherein the reinforced fiber substrate (B) exists in a folded state having a plurality of folds with a fold angle of 0° or more and less than 90° in the prepreg; and a method for producing a prepreg, including, in this order: Step [1]: a step of folding the reinforced fiber substrate (B) into a folded state having a plurality of folds with a fold angle of 0° or more and less than 90°; and Step [2]: a step of combining the resin (A) with the folded reinforced fiber substrate (B).

The present invention can easily provide a fiber-reinforced composite material achieving both lightweight properties and mechanical properties at a high level.

DETAILED DESCRIPTION OF EMBODIMENTS OF THE INVENTION

<Prepreg>
[Reinforced Fiber Substrate (B)]

In the prepreg according to embodiments of the present invention, the reinforced fiber substrate (B) exists in the prepreg in a folded state having a plurality of folds with a fold angle of 0° or more and less than 90°. The planar reinforced fiber substrate (B) is folded at a folding angle of 0° or more and less than 90°, whereby folds are going to extend to return the unfolded structure, that is, the restoring force, which is the force in the direction in which the fold angle expands, is released, and the expansion force in the thickness direction of the prepreg can be obtained in the molding of the prepreg into the fiber-reinforced composite material. The reinforced fiber substrate (B) in the prepreg is heated and molded to become the reinforcing fiber (B') in the microporous portion of the fiber-reinforced composite material.

Figure 4:
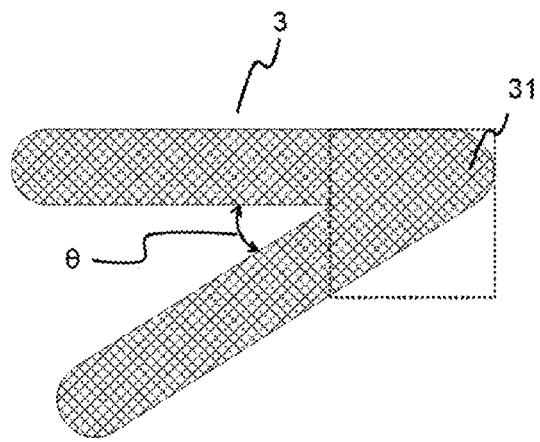
FIG. 4 is a schematic view for explaining a fold angle of a reinforced fiber substrate (B) in one embodiment of a prepreg.

Hereinafter, such a prepreg will be described. The fold angle in the present specification is an angle θ formed by a bent portion of the reinforced fiber substrate (B)3 around a fold 31 as shown in FIG. 4 when viewing a cross section orthogonal to the direction of the fold (hereinafter, unless otherwise specified in the present specification, the "cross section" means a cross section orthogonal to the direction of the fold). The fold angle of the reinforced fiber substrate (B) is preferably 0° or more and 75° or less, more preferably 0° or more and 45° or less, still more preferably 0° or more and 15° or less, and particularly preferably 1° or more and 5° or less. Such a range is preferable, because the expansion force in molding into the fiber-reinforced composite material can be increased.

When an optionally selected fold is defined as a first fold in the cross section, and counting in the order such that the fold adjacent to the first fold is a second fold, the fold further adjacent to the second fold is a third fold, and the fold further adjacent to the third fold is a fourth fold, the reinforced fiber substrate (B) is preferably folded in a manner such that the first fold and the fourth fold or any of folds after the fourth fold are adjacent. Folding in this manner causes a region obtained by folding between adjacent folds when the folds are extended to easily form a space, easily forming a coarse pore portion described later. In the present specification, the term "adjacent" is used as a term representing a concept including a case of being in contact. In addition, hereinafter, in the present specification, the adjacent first fold in this manner and a fold after the fourth fold, mostly adjacent to the first fold may be simply referred to as "a pair of adjacent folds".

In addition, in this case, Lr/Lf is preferably 0.3 or less and Lf is preferably 1 mm or more and 200 mm or less in the cross section, wherein Lr is a linear distance between a pair of adjacent folds, and Lf is a distance connected between a pair of adjacent folds along the reinforced fiber substrate (B). Lr/Lf is more preferably 0.2 or less, and still more preferably 0.05 or less. Lf is more preferably 1 mm or more and 100 mm or less, still more preferably 2 mm or more and 50 mm or less, and particularly preferably 3 mm or more and 10 mm or less. Such a range is preferable, because the pore size in molding into the fiber-reinforced composite material can be easily controlled.

Hereinafter, in order to further facilitate understanding, the folded state of the reinforced fiber substrate (B) in one embodiment of the present invention will be described with reference to the drawings specifically illustrating the folded state of the reinforced fiber substrate (B). The folded state of the reinforced fiber substrate (B) in the present invention is not limited by these drawings, and the following description of specific embodiments can also be understood as the description of the reinforced fiber substrate (B) in the prepreg of the present invention as a superordinate concept.

Figure 1:
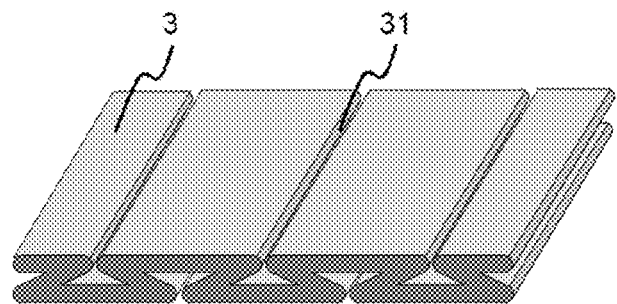
FIG. 1 is a schematic view showing a folded state of the reinforced fiber substrate (B) in one embodiment of the prepreg of the present invention.

FIG. 1 is a schematic perspective view showing only the reinforced fiber substrate (B) taken out for explaining the folded state of the reinforced fiber substrate (B) in the prepreg in one embodiment of the present invention. In addition, FIG. 2 is a schematic cross-sectional view of the prepreg in the same embodiment, and FIG. 3 is a schematic cross-sectional view with a part thereof further enlarged.

In the present embodiment, the reinforced fiber substrate (B) is in a folded state including a Z-shaped structure having bending points that are a first fold and at least one of second folds adjacent to the first fold when the first fold is an optionally selected fold in the cross section. For example, when a fold indicated by 31A in FIG. 3 is a first fold, the reinforced fiber substrate (B) is folded so as to form a Z-shaped structure having bending points that are the first fold and a fold indicated by 31B of one of second folds adjacent to the first fold in the cross section. Such a folded structure generates a force that causes the Z-shaped structure to extend up and down, easily forming the coarse pore portion described later. The reinforced fiber substrate (B) is in a folded state in which such a Z-shaped structure is continuous, allowing providing a large restoring force as a whole.

More specifically, in the present embodiment, the reinforced fiber substrate (B) has a folded structure including a substantially triangular structure formed in such a manner that a first fold is adjacent to one of fourth folds when a certain fold is the first fold in the cross section, wherein the fold adjacent to the first fold is a second fold, the fold further adjacent to the second fold is a third fold, and the fold further adjacent to the outside of the third fold is the fourth fold. For example, when a fold indicated by 31A in FIG. 3 is the first fold, one of the second folds is 31B, one of the third folds is 31C, and one of the fourth folds is a fold indicated by 31D, and the reinforced fiber substrate (B) has a folded structure including a substantially triangular structure formed by the first fold 31A adjacent to the fourth fold 31D. Herein, the first fold 31A and the fourth fold 31D may be adjacent each other or may be separated to some extent. That is, according to the above description, in the present embodiment, the fold 31A and the fold 31D are a pair of adjacent folds. In the former case, it can be said that a substantially triangular structure is formed by the contact point between the first fold 31A and the fourth fold 31D, the second fold 31B, and the third fold 31C, and in the latter case, it can be said that a substantially triangular structure with one end opened is formed by separation between the first fold 31A and the fourth fold 31D. In the present specification, the term "substantially triangular" is used as a term including such a structure. Such a folded structure generates a force that causes the substantially triangular structure to extend up and down, allowing providing a restoring force.

Figure 2:
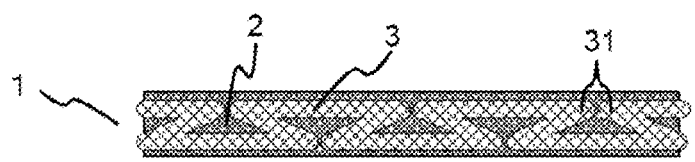
FIG. 2 is a schematic cross-sectional view showing one embodiment of the prepreg of the present invention.
Figure 3:
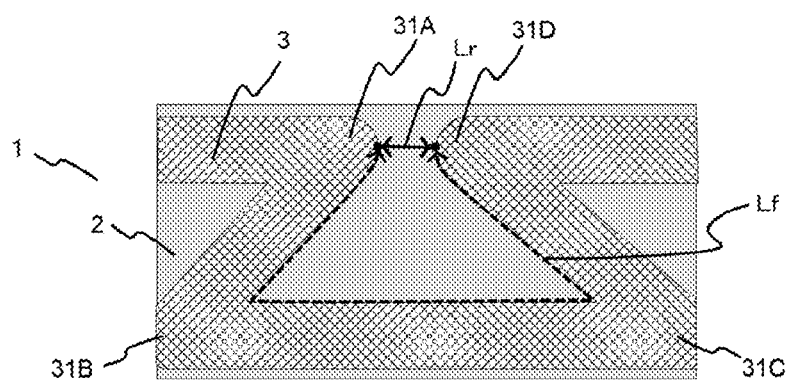
FIG. 3 is an enlarged schematic cross-sectional view showing a part of the prepreg of the embodiment shown in FIG. 2.

Furthermore, in the present embodiment, as shown in FIG. 2, the reinforced fiber substrate (B) has a folded structure in which the folded structure including the substantially triangular structure is not only reversed but also continuous. Having such a regular folded structure easily controls the expansion force in a desired direction. For the prepreg of the present invention, the reinforced fiber substrate (B) preferably has a regular folded structure over the entire prepreg in order to provide uniform expansion force, which is not limited to the present embodiment.

In addition, in the present embodiment, preferably, Lr/Lf is 0.3 or less and Lf is 1 mm or more and 200 mm or less, wherein Lr is a linear distance between the first fold and the fourth fold adjacent to the first fold, and Lf is a distance connecting the first fold to the fourth fold along the reinforced fiber substrate (B). As shown in FIG. 3, Lr is the shortest distance between the surfaces of the reinforced fiber substrates (B) in a pair of adjacent folds. Lf corresponds to the length of the reinforced fiber substrate (B) between a pair of adjacent folds, that is, from the first fold 31A to the fourth fold 31D in FIG. 3. Lr/Lf is preferably 0.2 or less, and more preferably 0.05 or less. Lf is more preferably 1 mm or more and 100 mm or less, still more preferably 2 mm or more and 50 mm or less, and particularly preferably 3 mm or more and 10 mm or less. Setting the ratio of Lr to Lf within such a range easily suppresses the expansion in the in-plane direction by canceling the restoring force in the in-plane direction, easily forms the coarse pore portion having the circumferential length corresponding to Lf, and easily controls the pore size of the coarse pore portion.

In embodiments of the present invention, examples of the reinforcing fiber included in the reinforced fiber substrate (B) include carbon fibers, glass fibers, metal fibers, aromatic polyamide fibers, polyaramid fibers, alumina fibers, silicon carbide fibers, boron fibers, and basalt fibers. They may be used singly or may be appropriately used in combination of two or more. Among these, the reinforcing fiber is preferably the carbon fiber from the viewpoint of excellent lightweight and mechanical properties. The reinforcing fiber preferably has an elastic modulus of 200 GPa or more. In addition, the carbon fiber is preferable as the reinforcing fiber, and the carbon fiber having an elastic modulus of 200 GPa or more is particularly preferable.

In embodiments of the present invention, the reinforcing fiber constituting the reinforced fiber substrate (B) is preferably a discontinuous fiber, more specifically, the number average fiber length is preferably 1 mm or more and 50 mm or less, the number average fiber length is more preferably 3 mm or more and 20 mm or less, and still more preferably 4 mm or more and 10 mm or less. Such a range is preferable, because both the easiness of folding the reinforced fiber substrate (B) and high restoring force for folding can be achieved at a high level. Herein, the number average fiber length can be determined as an arithmetic average value of fiber lengths obtained by randomly extracting 400 monofilaments of reinforcing fibers constituting the reinforced fiber substrate (B).

Furthermore, the reinforced fiber substrate (B) is preferably a nonwoven fabric composed of the discontinuous reinforcing fiber. The nonwoven fabric can be produced by, for example, an air-laid method, a carding method, and a papermaking method. In such a nonwoven fabric, the reinforcing fibers are preferably randomly dispersed. Randomly dispersed reinforcing fibers are preferable, because concentration unevenness between the resin (A) and the reinforced fiber substrate (B) is small, and a prepreg having excellent isotropy can be obtained.

In the prepreg of the present invention, the reinforced fiber substrate (B) is preferably in an amount of 10 parts by mass or more and 100 parts by mass or less, and the reinforced fiber substrate (B) is more preferably in an amount of 20 parts by mass or more and 50 parts by mass or less, with respect to 100 parts by mass of the resin (A). When less than such a range, the reinforcing effect by the reinforced fiber substrate (B) may be insufficient. When more than such a range, the weight reduction effect by the reinforcing fiber may be insufficient.

[Resin (A)]

In the prepreg of the present embodiment, the resin (A) is a resin with which the reinforced fiber substrate (B) is impregnated, more specifically, a resin with which all of both the inside of the reinforced fiber substrate (B) and the space formed between the reinforced fiber substrates (B) by folding the reinforced fiber substrate (B) are impregnated.

The resin (A) may be a thermoplastic resin or a thermosetting resin, and is preferably a thermoplastic resin. When the resin (A) is a thermosetting resin, heat resistance is excellent; however, in a stage of a prepreg, the cured resin (A) may be unpreferable. The prepreg is composed of the resin (A) and a reinforced fiber substrate (B) that is the sheet-shaped reinforcing fiber; however, the resin (A) is cured, which may not develop the restoring force of the folded structure of the reinforced fiber substrate (B) of the prepreg. The resin (A) is preferably a thermoplastic resin, because melting and softening of the resin (A) in heat molding can be performed stably, and a fiber-reinforced composite material excellent in lightweight properties can be obtained.

Examples of the thermoplastic resin include: polyester-based resins such as polyethylene terephthalate and polybutylene terephthalate; polyolefins such as polyethylene, polypropylene, polybutylene, and modified polypropylene; polyamides such as polyoxymethylene, polyamide 6, and polyamide 66; polycarbonate; polymethyl methacrylate; polyvinyl chloride; polyarylene sulfide such as polyphenylene sulfide; polyphenylene ether; modified polyphenylene ether; polyimide; polyamideimide; polyetherimide; polysulfone; modified polysulfone; polyethersulfone; polyarylene ether ketones such as polyketone, polyether ketone, polyether ether ketone, and polyether ketone ketone; polyarylate; polyether nitrile; and phenoxy resin. In addition, these thermoplastic resins may be copolymers or modified products, and/or blended resins of two or more thereof.

Among these, the thermoplastic resin is more preferably at least one selected from the group consisting of polyolefins, polycarbonates, polyesters, polyarylene sulfides, polyamides, polyoxymethylenes, polyetherimides, polyethersulfones, and polyarylene ether ketones from the viewpoint of balance between molding processability, heat resistance, and mechanical properties, and is still more preferably polypropylene from the viewpoint of productivity and cost.

In addition, the prepreg of the present invention can expand by using the restoring force of the inclusive reinforced fiber substrate (B), and therefore has excellent selectivity of the resin (A). For example, when a resin having high heat resistance, that is, a high melting point is selected as the resin (A), a high processing temperature is also required. In this case, undesirable side effects such as thermal decomposition and oxidation degradation occur, expansion is inhibited, and molding processability into a desired shape may be deteriorated. Whereas, in the prepreg according to embodiments of the present invention, the inclusive reinforced fiber substrate (B) exhibits high restoring force, and therefore the expansion force is excellent regardless of high temperature. From such a viewpoint, the resin (A) is more preferably at least one selected from the group consisting of polyamide, polyarylene sulfide, and polyarylene ether ketone, and still more preferably polyarylene sulfide or polyarylene ether ketone.

The resin (A) may further contain other fillers and additives depending on the use, as long as the object of the present invention is not impaired. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

The melting point of the thermoplastic resin used as the resin (A) is preferably 100° C. or more and 400° C. or less, more preferably 120° C. or more and 300° C. or less, and still more preferably 140° C. or more and 250° C. or less. Such a temperature range is preferable, because both molding processability into a fiber-reinforced composite material and heat resistance of the resulting fiber-reinforced composite material can be achieved. In addition, the glass transition temperature of the thermoplastic resin used as the resin (A) is preferably 0° C. or more and 250° C. or less, more preferably 50° C. or more and 200° C. or less, and still more preferably 100° C. or more and 160° C. or less. Particularly when the resin (A) is an amorphous thermoplastic resin, the glass transition temperature of the thermoplastic resin is preferably such a temperature range, because both molding processability into a fiber-reinforced composite material and heat resistance of the resulting fiber-reinforced composite material can be achieved.

[Method for Producing Prepreg]

As an example, the prepreg of the present invention can be produced by a production method including the following Steps [1] and [2] in this order.

Step [1]: a step of folding the reinforced fiber substrate (B) into a folded state having a plurality of folds with a fold angle of 0° or more and less than 90°; and Step [2]: a step of combining the resin (A) with the folded reinforced fiber substrate (B).

In Step [1], the reinforced fiber substrate (B) is folded in the folded state described above. Generally, a reinforcing fiber having a higher elastic modulus has a lower elongation and tends to be easily broken by bending. In Step [1], previously folding the reinforced fiber substrate (B) suppresses the curvature of the reinforcing fiber monofilament by the void between the reinforcing fibers, and the folding can be thus performed while suppressing the breakage of the fiber.

Examples of the method for combining the resin (A) with the reinforced fiber substrate (B) in Step [2] include a method of directly injecting the molten resin (A) into the reinforced fiber substrate (B) and a method of combining the film-shaped, powdery, or fibrous resin (A) with the reinforced fiber substrate (B) and performing the impregnation by heating and melting. From the viewpoint of ease of production, there is desirable a method of impregnating the reinforced fiber substrate (B) with the resin (A) by applying pressure with heating to a temperature equal to or higher than a temperature at which the resin (A) melts or softens. A press molding machine or a double belt press machine can be preferably used as apparatus for achieving such an impregnation method. The former is used in the case of batch type, and the productivity can be improved by using an intermittent press system in which two or more machines for heating and cooling are arranged in parallel. The latter is used in the case of continuous type, and the continuous productivity is excellent since continuous processing can be easily performed.

<Method for Producing Fiber-Reinforced Composite Material>

Figure 5:
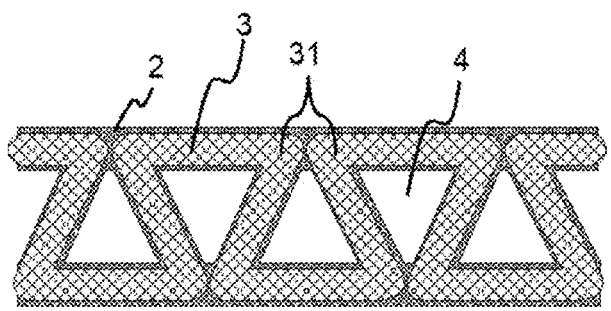
FIG. 5 is a schematic cross-sectional view showing one embodiment of the fiber-reinforced composite material of the present invention.

The fiber-reinforced composite material according to embodiments of the present invention can be produced by heating the prepreg to a temperature equal to or higher than a temperature at which the resin (A) melts or softens, and then molding. The resin (A) is heated to the temperature to softens, wherein the temperature equal to or higher than the temperature at which the resin (A) melts or softens, whereby releasing the restoring force with which the folded structure of the reinforced fiber substrate (B) returns to the unfolded structure, that is, the force in the direction in which the fold angle increases. This restoring force becomes an expansion force in the thickness direction of the prepreg, and the reinforced fiber substrate (B) with this expansion force expands the prepreg in a manner of pushing up by the reinforced fiber substrate (B). FIG. 5 is a schematic cross-sectional view showing an example of a fiber-reinforced composite material molded by using the prepreg shown in FIG. 2. As described above, the prepreg is heated to soften the resin (A), whereby the reinforced fiber substrate (B) is deformed in a direction in which the fold angle of the reinforced fiber substrate (B) is enlarged, and the prepreg expands. Typically, as illustrated in FIG. 5, the pore portion 4 is formed by this expansion.

Specifically, the temperature at which the resin (A) melts or softens may be higher than the melting point when the resin (A) is a crystalline thermoplastic resin; however, is preferably higher than the melting point by 20° C. or more. In addition, the temperature may be higher than the glass transition temperature when the resin (A) is an amorphous thermoplastic resin; however, is preferably higher than the glass transition temperature by 20° C. or more. The upper limit temperature is preferably a temperature applied equal to or lower than the thermal decomposition temperature of the resin (A).

In addition, in the molding, the thickness of the prepreg expanded by heating is preferably adjusted. The method for controlling the thickness is not limited as long as the obtained fiber-reinforced composite material can be controlled to a desired thickness, and there are preferable, for example, a method of constraining the thickness by using a metal plate or the like, and a method of directly controlling the thickness by adjusting the pressure, from the viewpoint of simplicity of production. A press molding machine or a double belt press machine can be preferably used as apparatus for achieving such a method. The former is used for a batch-type method, and it is possible to improve the productivity by employing an intermittent-type press system including two or more machines for heating and cooling in combination. The latter is for a continuous type, which can easily perform continuous processing and is thus excellent in continuous productivity.

<Fiber-Reinforced Composite Material>

In a preferable aspect, the fiber-reinforced composite material produced as described above has a coarse pore portion formed by a restoring force generated by extension of the folded structure of the reinforced fiber substrate (B). FIG. 5 is a schematic cross-sectional view showing an example of a fiber-reinforced composite material molded by using the prepreg shown in FIG. 2. Heating the prepreg provides the state with the resin (A) melted or softened, thus releasing the restoring force of the folded structure of the reinforced fiber substrate (B). This restoring force becomes the expansion force in the thickness direction of the prepreg, and this expansion force forms a coarse pore portion substantially surrounded by the reinforced fiber substrate (B).

Therefore, the folded structure of the reinforced fiber substrate is substantially the same as the folded structure in the prepreg described above, and the description of the folded structure follows the description in the prepreg described above. However, when molding is performed by using the prepreg described above, the fold angle of the reinforced fiber substrate (B) is increased by molding.

The coarse pore portion substantially surrounded by the folded reinforced fiber substrate (B) is a space defined only by the folded reinforced fiber substrate (B) impregnated with the resin (A) as shown in FIG. 5, or by the reinforced fiber substrate (B) impregnated with the resin (A) and the resin (A) present between adjacent folds of the reinforced fiber substrate (B), and is a space shown as a substantially triangular space 4 in FIG. 5. In the present embodiment, the fold may be actually unclear by the pressure during expansion, and a space having a substantially circular shape or a substantially elliptical shape may be formed. In addition, in the present embodiment, the coarse pore portion is formed as a hollow space with the direction of the fold of the reinforced fiber substrate (B) as the longitudinal direction.

The average value of the maximum lengths of the opening portions in the cross section of the coarse pore portions is preferably 500 μm or more. Herein, the maximum length of the cross-sectional opening portion is a maximum length that can be linearly drawn in the opening portion in the cross section of the fiber-reinforced composite material. When the average value of the maximum lengths of the opening portions is 500 μm or more, the weight reduction effect can be significant. The average value of the maximum lengths of the cross-sectional opening portions of the coarse pore portions is preferably 1000 μm or more and 10000 μm or less, more preferably 1500 μm or more and 6500 μm or less, and still more preferably 2500 μm or more and 4500 μm or less.

In addition, as shown in FIG. 5, the coarse pore portion preferably has a structure in which a pair of adjacent folds 31 of the reinforced fiber substrate (B) are bonded to each other by the resin (A). Such a structure suppresses deformation due to opening at a pair of adjacent folds when a load is applied to the fiber-reinforced composite material.

Figure 8:
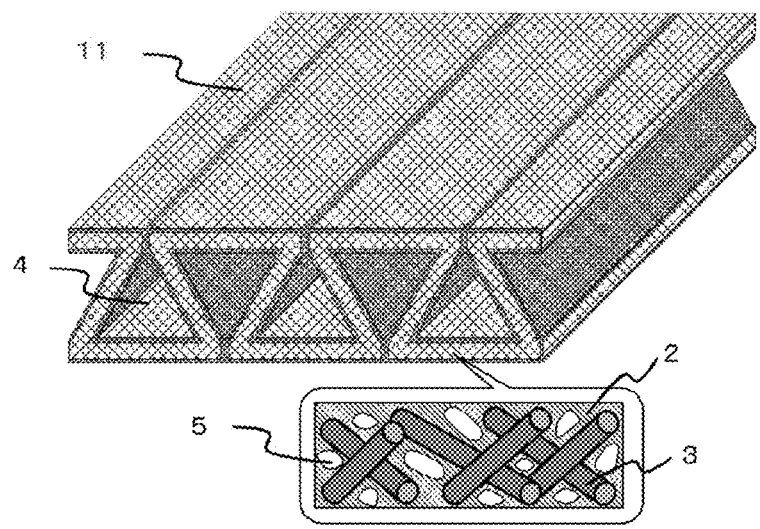
FIG. 8 is a schematic view showing one embodiment of the fiber-reinforced composite material of the present invention.

In a more preferable aspect, as shown in FIG. 8, the fiber-reinforced composite material has a microporous structure 5 in a resin (A)2 impregnated into a reinforced fiber substrate (B)3. Hereinafter, this embodiment will be described.

Figure 6:
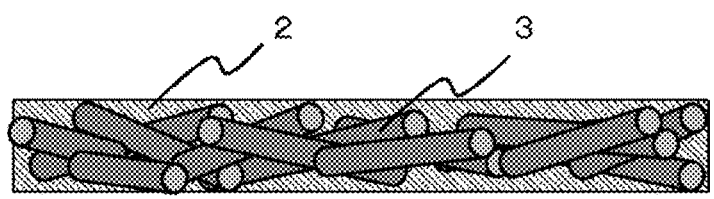
FIG. 6 is an enlarged schematic view showing the periphery of the reinforced fiber substrate (B) in one embodiment of the prepreg of the present invention.
Figure 7:
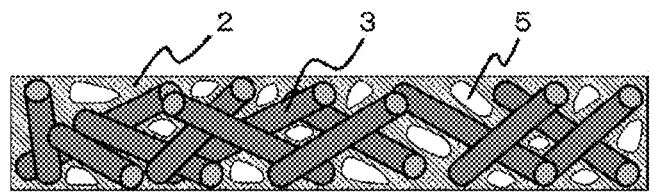
FIG. 7 is an enlarged schematic view of a microporous portion in one embodiment of the fiber-reinforced composite material of the present invention.

FIG. 6 is an enlarged schematic view showing one embodiment of the reinforced fiber substrate (B) included in the prepreg described above together with the resin (A) impregnated therein. In the present embodiment, the reinforced fiber substrate (B) is a nonwoven fabric composed of the discontinuous reinforcing fiber. In the reinforced fiber substrate (B) impregnated with the resin (A) and in a compressed state, the resin (A) is melted or softened to release the compressed state, thereby resulting in spring back. This spring back forms fine pores in the resin (A) between the reinforcing fibers, as shown in FIG. 7. That is, micropores are formed in the resin (A) impregnated into the reinforced fiber substrate (B). Hereinafter, such a portion where a microporous structure is formed in the resin (A) impregnated into the reinforced fiber substrate (B) is referred to as a "microporous portion".

The microporous portion preferably has an average pore diameter of 200 μm or less as measured by a mercury intrusion method. The average pore diameter is preferably 10 μm or more and 150 μm or less, and more preferably 30 μm or more and 100 μm or less. When less than such a range, the weight reduction effect may be insufficient, and at more than such a range, the mechanical properties may be deteriorated. The mercury intrusion method is a method for measuring a pore size with a mercury intrusion porosimeter, wherein mercury is injected into a sample at a high pressure and the pore size can be determined from the applied pressure and the amount of injected mercury. The average pore diameter is a value that can be determined from the following formula (1):

$$(\text{Average pore diameter})=4\times(\text{pore volume})/(\text{specific surface area}) \quad (1).$$

In addition, the specific gravity of the microporous portion is preferably 0.3 g/cm³ or more and 0.8 g/cm³ or less, and more preferably 0.4 g/cm³ or more and 0.7 g/cm³ or less. When less than such a range, mechanical properties may be deteriorated, and when more than such a range, the weight reduction effect may be insufficient. Herein, the specific gravity is a value obtained by dividing the mass [g] of the sample obtained by cutting out only the microporous portion by the volume [cm³] obtained from the sample shape, and is an arithmetic average value of specific gravities measured for five randomly extracted samples.

As the entire fiber-reinforced composite material finally obtained, the specific gravity is preferably 0.001 g/cm³ or more and 0.2 g/cm³ or less, more preferably 0.01 g/cm³ or more and 0.15 g/cm³ or less, and still more preferably 0.01 g/cm³ or more and 0.1 g/cm³ or less. When less than such a range, mechanical properties may be insufficient. When more than such a range, the weight reduction effect may be insufficient. A specific gravity of 0.1 g/cm³ or less is preferable, because generally mechanical properties are particularly difficult to be exhibited, and the effect of the present application can be efficiently exhibited. Herein, the specific gravity is a value obtained by dividing the sample mass [g] by the volume [cm³] obtained from the sample shape.

The thickness of the fiber-reinforced composite material is preferably 0.1 mm or more and 5 mm or less, and more preferably 0.6 mm or more and 3 mm or less. Such a range is preferable, because the effect of lightweight and excellent mechanical properties in the present application can be efficiently exhibited although the thickness is thin. Particularly, a fiber-reinforced composite material having pores tends to have difficulty in maintaining pressure in a step of pressure-bonding other materials such as a pressing step. The fiber-reinforced composite material in the present application, which achieves both lightweight properties and mechanical properties by controlling the pores, is preferable because it can be preferably applied to such a pressure-bonding step.

Furthermore, the fiber-reinforced composite material of the present invention preferably has a structure in which the cross-sectional opening portion of the coarse pore portion is aligned in the in-plane direction, and may be a laminate obtained by laminating a plurality of layers of structures derived from the prepreg having such a structure. Such a laminate is preferable, because a thick or uneven molded product can be easily obtained. In addition, it is more preferable to have a laminated structure in which the layers aligned in the cross-sectional opening portions of the coarse pore portions are laminated while changing the extending direction of the cross-sectional opening portions of the coarse pore portions for each layer, and it is still more preferable to have a laminated structure in which the lamination is performed so that the extending direction of the cross-sectional opening portion of the coarse pore portion for each layer is orthogonal to each other. In this case, in the above description regarding the fiber-reinforced composite material of the present invention, the content described using the extending direction of the cross-sectional opening portion of the coarse pore portion should be understood as the description for each layer. The number of the laminated layers is preferably 2 or more and 50 or less, and more preferably 2 or more and 10 or less.

The lamination method is not particularly limited, and examples thereof include a method of heating a prepreg after lamination, and a method of laminating a fiber-reinforced composite material that has been previously heated and molded. There is no particular limitation on the bonding between the layers during lamination, and examples thereof include bonding with an adhesive and heat welding. Particularly, as described above, the prepreg and the fiber-reinforced composite material of the present invention having an excellent expansion force are preferable because of having an excellent pore holding ability in a heating and pressurizing process during heat welding. In addition, one aspect of the present invention is a preform obtained by laminating the above prepregs for obtaining a fiber-reinforced composite material that is such a laminate.

<Sandwich Structure>

The fiber-reinforced composite material of the present invention is also preferably a sandwich structure in which skin layers composed of another fiber-reinforced resin are disposed on both sides thereof. Preferably, the skin layer is a layer having a higher elastic modulus than that of the fiber-reinforced composite material. The method for bonding the skin layers is not particularly limited, and examples thereof include bonding with an adhesive and heat welding. Particularly, as described above, the fiber-reinforced composite material of the present invention having an excellent expansion force is preferable because of having an excellent pore holding ability in a heating and pressurizing process during heat welding.

The same type of the reinforcing fiber as the above reinforced fiber substrate (B) can be preferably used as the reinforcing fiber included in the fiber-reinforced resin of the skin layer, and the carbon fiber is preferable from the viewpoint of lightweight properties, mechanical properties, and economic efficiency. The reinforcing fiber constituting the fiber-reinforced resin of the skin layer preferably has a number average fiber length of 100 mm or more, and preferably 150 mm or more. The upper limit of the length of the reinforcing fiber is not particularly limited, and the reinforcing fiber may be continuous over the entire width of the skin layer in the fiber orientation direction or may be divided in the middle. From the viewpoint of mechanical properties of the sandwich structure, continuous reinforcing fibers are preferably arranged in one direction. In addition, from the viewpoint of isotropy of mechanical properties, the skin layer particularly preferably has a structure in which a fiber-reinforced resin layer with reinforcing fibers arranged in one direction is laminated in a plurality of layers while changing a lamination angle, that is, while changing an arrangement direction of the reinforcing fibers in each layer.

In addition, the resin included in the fiber-reinforced resin of the skin layer is preferably a thermosetting resin. Examples of the thermosetting resin include unsaturated polyester resins, vinyl ester resins, epoxy resins, phenol resins, urea resins, melamine resins, polyimide resins, cyanate ester resins, bismaleimide resins, benzoxazine resins, copolymers or modified products thereof, and resins obtained by blending at least 2 kinds thereof. Among these, an epoxy resin excellent in mechanical properties, heat resistance, and adhesion to the reinforcing fiber is preferable as the thermosetting resin.

EXAMPLES

Materials used in examples and comparative examples are as follows.

[PP Resin]

A crystalline polypropylene resin composition composed of 80% by mass of polypropylene ("Prime Polypro" (registered trademark) J105G manufactured by PRIME POLYMER Co., Ltd.) and 20% by mass of acid-modified polypropylene ("ADMER" QB510 manufactured by Mitsui Chemicals, Inc.) and having a melting point of 160° C. measured in accordance with JIS K7121 (2012) was used. Such a polypropylene resin composition was produced as resin pellets by mixing polypropylene as a thermoplastic resin and acid-modified polypropylene as raw materials at the above mass ratio, and then melt-kneading with a twin-screw extruder at a cylinder temperature of 200° C. Furthermore, these resin pellets were press-molded by using a press molding machine adjusted so as to have a mold surface temperature of 180° C. and a film thickness of 0.22 mm to produce a PP resin film having a basis weight of 200 g/cm$^2$.

[PC Resin]

A polycarbonate resin was used, which is an amorphous thermoplastic resin, composed of polycarbonate ("Iupilon" (registered trademark) H-4000 manufactured by Mitsubishi Engineering-Plastics Corporation) and having a glass transition temperature of 150° C. measured in accordance with JIS K7121 (2012). Resin pellets of polycarbonate as a thermoplastic resin were press-molded by using a press molding machine adjusted so as to have a mold surface temperature of 240° C. and a film thickness of 0.17 mm to produce a PC resin film having a basis weight of 200 g/cm$^2$.

[PA Resin]

A crystalline polyamide resin composed of polyamide 6 ("Amilan" (registered trademark) CM1017 manufactured by Toray Industries, Inc.) and having a melting point of 225° C. measured in accordance with JIS K7121 (2012) was used. Resin pellets of polyamide as a thermoplastic resin were press-molded by using a press molding machine adjusted so as to have a mold surface temperature of 260° C. and a film thickness of 0.18 mm to produce a PA resin film having a basis weight of 200 g/cm$^2$.

[PPS Resin]

A crystalline polyarylene sulfide resin composed of polyphenylene sulfide ("Torelina" (registered trademark) A900 manufactured by Toray Industries, Inc.) and having a melting point of 278° C. measured in accordance with JIS K7121 (2012) was used. Resin pellets of polyarylene sulfide, which is a thermoplastic resin, were press-molded by using a press molding machine adjusted so as to have a mold surface temperature of 300° C. and a film thickness of 0.15 mm to produce a PPS resin film having a basis weight of 200 g/cm$^2$.

[PEKK Resin]

A crystalline polyarylene ether ketone resin composed of polyether ketone ketone ("KEPSTAN" (registered trademark) 6002 manufactured by Arkema Inc.) and having a melting point of 305° C. measured in accordance with JIS K7121 (2012) was used. Resin pellets of polyarylene ether ketone, which is a thermoplastic resin, were press-molded by using a press molding machine adjusted so as to have a mold surface temperature of 350° C. and a film thickness of 0.16 mm to produce a PEKK resin film having a basis weight of 200 g/cm$^2$.

[Carbon Fiber Nonwoven Fabric]

A copolymer mainly composed of polyacrylonitrile was subjected to spinning, a firing treatment, and a surface oxidation treatment to provide a carbon fiber bundle having a total of 12000 monofilaments. The properties of this carbon fiber bundle were a tensile elastic modulus of 220 GPa measured in accordance with JIS R7608 (2007), and a circular cross section with a single fiber diameter of 7 μm.

The carbon fiber bundle was cut into a length of 6 mm with a cartridge cutter to provide a chopped carbon fiber. A dispersion solution composed of water and a surfactant (polyoxyethylene lauryl ether (trade name) manufactured by NACALAI TESQUE, INC.) and having a concentration of 0.1% by mass was produced, and a carbon fiber substrate was produced by using this dispersion solution and the chopped carbon fiber. The production apparatus includes a cylindrical container having a diameter of 1000 mm and having an opening and closing cock at a lower part of the container as a dispersion tank, and a linear transport unit (inclination angle 30°) that connects the dispersion tank and a papermaking tank. A stirrer is attached to an opening at the top surface of the dispersing tank, and the chopped carbon fibers and the dispersion solution (dispersion medium) can be charged from the opening. The papermaking tank includes a mesh conveyor having a 500-mm wide papermaking surface at the bottom and has the mesh conveyor thereof connected to a conveyor capable of delivering a carbon fiber substrate (papermaking substrate). papermaking was performed at a carbon fiber concentration in the dispersion solution of 0.05% by mass. The carbon fiber substrate subjected to papermaking was dried in a drying furnace at 200° C. for 30 minutes to provide a carbon fiber nonwoven fabric composed of discontinuous reinforcing fibers in which the orientation directions of monofilaments of the carbon fiber were randomly dispersed. The obtained carbon fiber nonwoven fabric was observed by using a laser microscope (VK-9510 manufactured by KEYENCE CORPORATION), the fiber lengths of a total of 400 pieces of reinforcing fibers were measured by software attached to the apparatus, and the number average fiber length of the reinforcing fibers determined as the arithmetic average value thereof was 6 mm.

[Thermosetting Prepreg Used in Skin Layer]

A copolymer mainly composed of polyacrylonitrile was subjected to spinning, a firing treatment, and a surface oxidation treatment to provide a carbon fiber bundle having a total of 12000 monofilaments. The properties of this carbon fiber bundle were a tensile elastic modulus of 220 GPa measured in accordance with JIS R7608 (2007), and a circular cross section with a single fiber diameter of 7 μm.

An uncured epoxy plastic composition was adjusted by heating and kneading, with a kneader, epoxy plastic (30 parts by mass of "EPIKOTE (registered trade mark)" 828, 35 parts by mass of "EPIKOTE (registered trademark)" 1001, and 35 parts by mass of "EPIKOTE (registered trademark)" 154 manufactured by Japan Epoxy Resins Co., Ltd.) and 5 parts by mass of thermoplastic polyvinyl formal ("Vinylec (registered trademark)" K manufactured by CHISSO CORPORATION) to uniformly dissolve polyvinyl formal, and then kneading, with a kneader, 3.5 parts by mass of a curing agent dicyandiamide (DICY7 manufacture by Japan Epoxy Resins Co., Ltd.) and 7 parts by mass of a curing accelerator 4,4-methylenebis(phenyldimethylurea) ("OMICURE" (registered trademark) 52 from PTI Japan Limited). From this, an epoxy resin film having a basis weight of 132 g/m² was produced by using a knife coater.

Then, a sheet with carbon fiber bundles oriented in one direction was prepared, and epoxy resin films were stacked on both surfaces thereof, and heated and pressurized to impregnate with the epoxy resin, thereby providing a thermosetting prepreg having a mass of the carbon fiber per unit area of 125 g/m², a fiber volume content of 60%, and a thickness of 0.125 mm.

The methods for evaluating, for example, the structure and physical properties in the examples and comparative examples are as follows.

[Evaluation of Fold Angle]

A sample was cut out from the prepreg so that a cross section orthogonal to the fold of the carbon fiber nonwoven fabric was an observation surface, and polishing was performed so that the cross section of the fold of the carbon fiber nonwoven fabric was able to be observed. The obtained sample was observed with a laser microscope (VK-9510 manufactured by KEYENCE CORPORATION), and in the observation image, the angle was measured by software attached to the apparatus, and for each fold, as shown in FIG. 4, there was obtained the angle θ formed by the bending portion around the fold 31 of a carbon fiber nonwoven fabric 3. A fold angle was obtained for a total of 20 folds, and the arithmetic average value was obtained.

[Evaluation of Lr and Lf]

A sample was cut out from the prepreg so that a cross section orthogonal to the fold of the carbon fiber nonwoven fabric was an observation surface, and polishing was performed so that there was able to be observed a pair of adjacent folds and the cross section of a continuous carbon fiber nonwoven fabric connecting a pair of the adjacent folds. The obtained sample was observed with a laser microscope (VK-9510 manufactured by KEYENCE CORPORATION), and in the observation image, the length was measured by software attached to the apparatus to determine a linear distance (Lr) between a pair of adjacent folds and a distance (Lf) connecting a pair of the adjacent folds along the carbon fiber nonwoven fabric. Lr, Lf, and Lr/Lf were determined for a total of 20 adjacent folds, and the arithmetic average value was determined.

[Evaluation of Coarse Pore Portion]

A sample was cut out from the fiber-reinforced composite material so that a cross section parallel to the thickness direction was an observation surface, and polishing was performed so that there was able to be observed a pair of adjacent folds and a cross section of a continuous carbon fiber nonwoven fabric connecting a pair of the adjacent folds. The obtained sample was observed with a laser microscope (VK-9510 manufactured by KEYENCE CORPORATION) to observe the cross section of the coarse pore portion as a planar cross-sectional opening portion. The length was measured by software attached to the apparatus to determine the length of the maximum straight line that can be drawn in the cross-sectional opening portion. The length was measured for a total of 20 cross-sectional opening portions, and the arithmetic average value thereof was taken as the maximum length of the cross-sectional opening portion. each of adjacent cross-sectional opening portions were used and samples spaced 5 cm or more apart in the depth direction were prepared, and the measurement results thereof were used as the value used for the arithmetic average.

[Evaluation of Average Pore Diameter]

Using Autopore IV9510 manufactured by Micromeritics Instrument Corporation as a mercury intrusion porosimeter, and the pore size was measured at a mercury intrusion pressure in the range of 4 kPa to 400 MPa. The average pore diameter was determined from the pore volume and the specific surface area obtained as a measurement result by the formula (1).

$$(\text{Average pore diameter}) = 4 \times (\text{pore volume}) / (\text{specific surface area}) \qquad (1).$$

[Evaluation of Specific Gravity of Microporous Portion]

The specific gravity of the microporous portion is a value obtained by preparing a sample obtained by cutting out the microporous portion from the fiber-reinforced composite material, dividing the sample mass [g] by the volume [cm$^3$] obtained from the outer periphery of the sample, and is obtained from the arithmetic average value of the specific gravities measured for five randomly extracted samples.

[Evaluation of Specific Gravity of Fiber-Reinforced Composite Material]

The specific gravity of the fiber-reinforced composite material can be determined as a value obtained by dividing the mass [g] of the fiber-reinforced composite material by the volume [cm$^3$] determined from the outer periphery of the fiber-reinforced composite material.

[Evaluation of Deflection Under Load]

Using "Instron" (registered trademark) model 5565 universal material testing machine (manufactured by Instron Japan Co., Ltd.) as a testing machine, a sample was placed on a lower indenter having a square inner diameter of 100 mm on each side so as to cover the inner diameter, a load was gradually applied by a cylindrical upper indenter having a planar area of 10 mm$^2$ from immediately above an intersection of diagonals of the square inner diameter, and a value obtained by subtracting a displacement at a load of 0.1 N (at starting contact) from a displacement at a load of 50 N was defined as a deflection amount [mm], evaluation was performed in the following three stages, and good and fair were regarded as acceptable.

good: the deflection amount was 2 mm or less.
fair: the deflection amount is more than 2 mm and 3 mm or less.
bad: the deflection amount is larger than 3 mm.

Hereinafter, prepregs, fiber-reinforced composite materials, and sandwich structures produced in examples and comparative examples will be described.

Example 1

Figure 9:
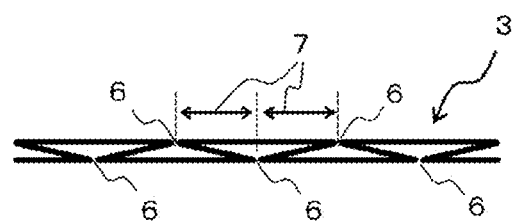
FIG. 9 is a schematic view showing a folded state of the reinforced fiber substrate (B) in the prepreg produced in Example 1.

A folded substrate having a basis weight of 100 g/cm$^2$ was prepared as the reinforced fiber substrate (B) by regularly folding the carbon fiber nonwoven fabric produced as described above over the entire prepreg so as to have the cross-sectional structure shown in FIG. 9. In this case, the prepreg was obtained by folding in such a manner that one of the first fold and the fourth fold was mostly adjacent to each other in a pair of adjacent folds 6 of the reinforced fiber substrate (B), a pair of adjacent folds were contact with each other, that is, a linear distance (Lr) therebetween was 0 mm, and a distance (Lf) between a pair of the adjacent folds connected along the carbon fiber nonwoven fabric as the reinforced fiber substrate (B) was 10 mm. Furthermore, the folding was performed so that a constituent ratio 7 of a pair of adjacent folds viewed from the front and back of the folded substrate was a symmetrical structure.

That is, a pair of adjacent folds on one surface was disposed between a pair of adjacent folds and a pair of adjacent folds disposed adjacent thereto in the other surface, and the folding was repeated. In other words, the reinforced fiber substrate (B) exists in a folded state including a structure with a continuous Z-shaped structure having the first fold and one of the second folds adjacent to the first fold as bending points.

The reinforced fiber substrate (B) exists in a folded state including a substantially triangular structure formed by a pair of adjacent folds, and has a continuous folded structure with repeatedly inverted folded structures including the substantially triangular structure.

Then, a PP resin film having a basis weight of 200 g/cm$^2$ as the resin (A) was laminated on the carbon fiber nonwoven fabric, and heat-pressed. In the heat-pressing step, the carbon fiber nonwoven fabric was impregnated with the PP resin by pressurization at a mold temperature of 180° C. and a pressure of 3 MPa for 10 minutes to provide a prepreg having a side of 200 mm.

In addition, one sheet of the obtained prepreg was thermally expanded for 10 minutes by using a press molding machine adjusted so as to have a mold surface temperature of 180° C. and a molded product thickness of 2.8 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 2

A prepreg and a fiber-reinforced composite material were obtained by performing processing in the same manner as in Example 1, except that the configuration of the folded substrate was changed so that Lr was 1 mm and Lf was 9 mm as the reinforced fiber substrate (B). The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 3

Figure 12:
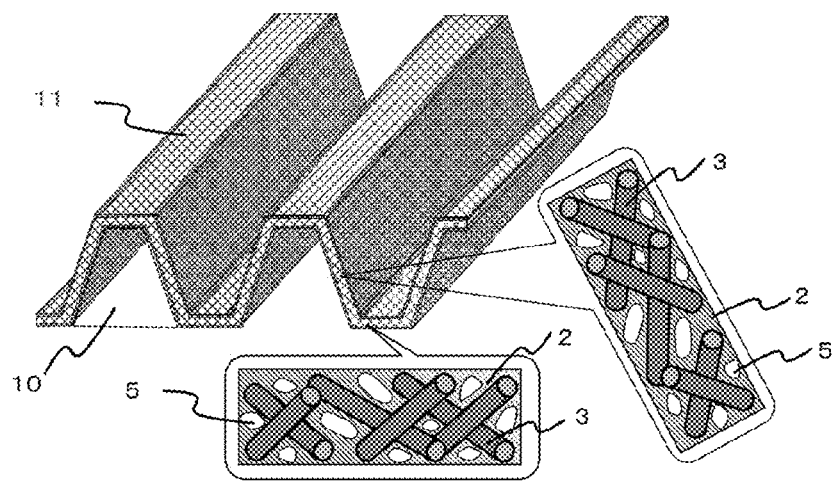
FIG. 12 is a schematic view showing one embodiment of the fiber-reinforced composite material produced in Example 3.

A prepreg and a fiber-reinforced composite material were obtained by performing processing in the same manner as in Example 1, except that the configuration of the folded substrate was changed so that Lr was 2 mm and Lf was 8 mm as the reinforced fiber substrate (B). The obtained fiber-reinforced composite material had an opening portion having a substantially trapezoidal cross section constituting three sides of the microporous portion as shown in FIG. 12. The opening portions of the empty coarse pore portions were aligned in the in-plane direction. The evaluation results are shown in Table 1.

Example 4

The same folded substrate as in Example 1 was used as the reinforced fiber substrate (B), a PC resin film having a basis weight of 200 g/cm$^2$ was laminated as the resin (A), and heat-pressing was performed. In the heat-pressing step, the carbon fiber nonwoven fabric was impregnated with the PC resin by pressurization at a mold temperature of 240° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 240° C. and a molded product thickness of 2.2 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 5

Figure 10:
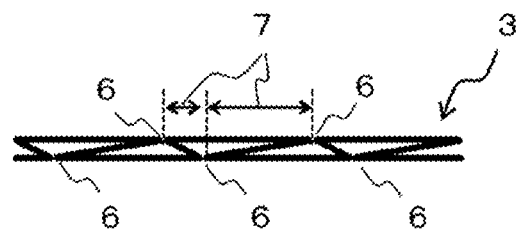
FIG. 10 is a schematic view showing a folded state of the reinforced fiber substrate (B) in the prepreg produced in Example 5.

A folded substrate having a basis weight of 100 g/cm$^2$ was prepared as the reinforced fiber substrate (B) by regularly folding the carbon fiber nonwoven fabric over the entire prepreg so as to have the cross-sectional structure shown in FIG. 10. In this case, the prepreg was obtained by folding in such a manner that one of the first fold and the fourth fold was mostly adjacent to each other in a pair of adjacent folds 6 of the reinforced fiber substrate (B'), a pair of adjacent folds were contact with each other, that is, a linear distance (Lr) therebetween was 0 mm, and a distance (Lf) between a pair of the adjacent folds connected along the carbon fiber nonwoven fabric as the reinforced fiber substrate (B) was 10 mm. Furthermore, the folding was performed so that a constituent ratio 7 of a pair of adjacent folds viewed from the front and back of the folded substrate was an asymmetric structure. That is, there was repeated folding in such a manner that on one surface, at a position where a distance between a pair of adjacent folds and a pair of adjacent folds arranged next to a pair of the adjacent folds is divided on a one-to-four basis, a pair of adjacent folds on the other surface was arranged. In other words, the reinforced fiber substrate (B) exists in a folded state including a structure with a continuous Z-shaped structure having the first fold and one of the second folds adjacent to the first fold as bending points.

The reinforced fiber substrate (B) exists in a folded state including a substantially triangular structure formed by a pair of adjacent folds, and has a continuous folded structure with repeatedly inverted folded structures including the substantially triangular structure.

Then, a PP resin film having a basis weight of 200 g/cm$^2$ as the resin (A) was laminated on the carbon fiber nonwoven fabric, and heat-pressed. In the heat-pressing step, the carbon fiber nonwoven fabric was impregnated with the PP resin by pressurization at a mold temperature of 180° C. and a pressure of 3 MPa for 10 minutes to provide a prepreg having a side of 200 mm.

In addition, one sheet of the obtained prepreg was thermally expanded for 10 minutes by using a press molding machine adjusted so as to have a mold temperature of 180° C. and a molded product thickness of 2.8 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 6

Two sheets of the prepregs obtained in Example 1 were laminated to form a preform, and heating was performed for 10 minutes by using a press molding machine adjusted so as to have a mold temperature of 180° C. and a molded product thickness of 4.8 mm, thereby molding a fiber-reinforced composite material of a laminate. The obtained fiber-reinforced composite material had a cross-sectional opening portion of a coarse pore portion whose three sides surrounded by a microporous portion as shown in FIG. 8, and had a structure in which this was laminated in two layers. The cross-sectional opening portions of the coarse pore portions were aligned in the in-plane direction. The evaluation results are shown in Table 1.

Example 7

The same folded substrate as in Example 1 was used as the reinforced fiber substrate (B), a PA resin film having a basis weight of 200 g/cm$^2$ was laminated as the resin (A), and heat-pressing was performed. In the heat-pressing step, the carbon fiber nonwoven fabric was impregnated with the PA resin by pressurization at a mold temperature of 260° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 260° C. and a molded product thickness of 2.8 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 8

The same folded substrate as in Example 1 was used as the reinforced fiber substrate (B), a PPS resin film having a basis weight of 200 g/cm$^2$ was laminated as the resin (A), and heat-pressing was performed. In the heat-pressing step, the carbon fiber nonwoven fabric was impregnated with the PPS resin by pressurization at a mold temperature of 300° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 300° C. and a molded product thickness of 2.8 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 9

The same folded substrate as in Example 1 was used as the reinforced fiber substrate (B), a PEKK resin film having a basis weight of 200 g/cm$^2$ was laminated as the resin (A), and heat-pressing was performed. In the heat-pressing step, the carbon fiber nonwoven fabric was impregnated with the PEKK resin by pressurization at a mold temperature of 350° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 350° C. and a molded product thickness of 2.8 mm, thereby molding a fiber-reinforced composite material. The obtained fiber-reinforced composite material had an opening portion having a substantially triangular cross section surrounded by three sides of a microporous portion as shown in FIG. 8. The opening portions of the coarse pore portions were aligned in the in-plane direction. The evaluation results are shown in Table 1.

Example 10

The fiber-reinforced composite material obtained in Example 1 was used for a core layer, the thermosetting prepreg produced as described above was disposed as a skin layer on the outer side thereof, and the lamination was performed so that the lamination configuration was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the fiber-reinforced composite material in the obtained sandwich structure was 2.4 mm, no crush occurred during formation of the sandwich structure, and thus the core layer was able to be well used.

Example 11

The fiber-reinforced storage material of the laminate obtained in Example 6 was used for a core layer, the thermosetting prepreg was disposed as a skin layer on the outer side thereof, and the lamination was performed so that the lamination configuration was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the laminate in the obtained sandwich structure was 4.3 mm, no crush occurred during formation of the sandwich structure, and thus the core layer was able to be well used.

Comparative Example 1

Figure 11:
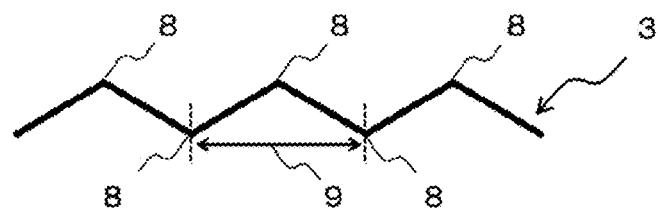
FIG. 11 is a schematic view showing a folded state of the reinforced fiber substrate (B) in the prepreg produced in Comparative Example 1.
Figure 13:
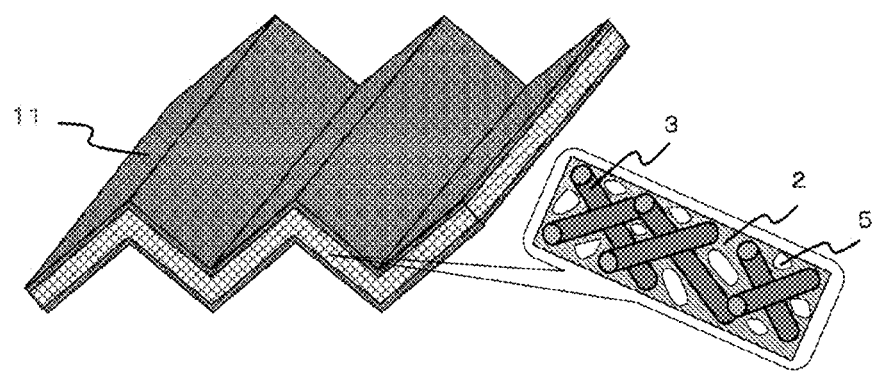
FIG. 13 is a schematic view showing one embodiment of the fiber-reinforced composite material produced in Comparative Example 1.

A substrate having a basis weight of 100 g/cm² was prepared by regularly folding a carbon fiber nonwoven fabric over the entire prepreg so as to have a cross-sectional structure having an apex 8 of a zigzag structure as shown in FIG. 11. In this case, folds were formed so that a repetition interval 9 between the apexes of the zigzag structure was 5 mm at equal intervals. Then, a PP resin film having a basis weight of 200 g/cm² was laminated on the substrate, and heat-pressed. In the heat-pressing step, the above substrate was impregnated with the PP resin by pressurization at a mold temperature of 180° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 180° C. and a molded product thickness of 2.8 mm, thereby molding a fiber-reinforced composite material. In the obtained fiber-reinforced composite material, the cross section of the microporous portion 11 had a zigzag structure as shown in FIG. 13. The results of the evaluation are shown in Table 2.

Comparative Example 2

A PP resin film having a basis weight of 200 g/cm² was laminated on a flat carbon fiber nonwoven fabric having no fold and 100 g/cm², and heat-pressed. In the heat-pressing step, the above substrate was impregnated with the PP resin by pressurization at a mold temperature of 180° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 180° C., thereby molding a fiber-reinforced composite material. The distance between the upper mold and the lower mold of the mold was set to 2.8 mm, and the molding was performed for the purpose of having a mold product thickness of 2.8 mm; however, the prepreg did not expand to the thickness between the upper mold and the lower mold of the mold, and the thickness of the obtained fiber-reinforced composite material remained at 0.9 mm. The results of the evaluation are shown in Table 2.

Comparative Example 3

A PA resin film having a basis weight of 200 g/cm² was laminated on a flat carbon fiber nonwoven fabric having no fold and 100 g/cm², and heat-pressed. In the heat-pressing step, the above substrate was impregnated with the PA resin by pressurization at a mold temperature of 260° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 260° C., thereby molding a fiber-reinforced composite material. The distance between the upper mold and the lower mold of the mold was set to 2.8 mm, and the molding was performed for the purpose of having a mold product thickness of 2.8 mm; however, the prepreg did not expand to the thickness between the upper mold and the lower mold of the mold, and the thickness of the obtained fiber-reinforced composite material remained at 0.8 mm. The results of the evaluation are shown in Table 2.

Comparative Example 4

A PPS resin film having a basis weight of 200 g/cm² was laminated on a flat carbon fiber nonwoven fabric having no fold and 100 g/cm², and heat-pressed. In the heat-pressing step, the above substrate was impregnated with the PPS resin by pressurization at a mold temperature of 300° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 300° C., thereby molding a fiber-reinforced composite material. The distance between the upper mold and the lower mold of the mold was set to 2.8 mm, and the molding was performed for the purpose of having a mold product thickness of 2.8 mm; however, the prepreg did not expand to the thickness between the upper mold and the lower mold of the mold, and the thickness of the obtained fiber-reinforced composite material remained at 0.4 mm. The results of the evaluation are shown in Table 2.

Comparative Example 5

A PEKK resin film having a basis weight of 200 g/cm² was laminated on a flat carbon fiber nonwoven fabric having no fold and 100 g/cm², and heat-pressed. In the heat-pressing step, the above substrate was impregnated with the PEKK resin by pressurization at a mold temperature of 350° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 350° C., thereby molding a fiber-reinforced composite material. The distance between the upper mold and the lower mold of the mold was set to 2.8 mm, and the molding was performed for the purpose of having a mold product thickness of 2.8 mm; however, the prepreg did not expand to the thickness between the upper mold and the lower mold of the mold, and the thickness of the obtained fiber-reinforced composite material remained at 0.6 mm. The results of the evaluation are shown in Table 2.

Comparative Example 6

The fiber-reinforced composite material obtained in Comparative Example 1 was used for a core layer, the thermosetting prepreg was disposed as a skin layer on the outer side thereof, and the lamination was performed so that the lamination configuration of the thermosetting prepreg was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the fiber-reinforced composite material in the obtained sandwich structure was 0.6 mm, and crushing occurred by the molding pressure for forming the sandwich structure, and the use as a core layer was impossible.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Fold angle | ° | 5 | 6 | 8 | 5 | 10 | 5 | 5 | 5 | 5 |
| Lr | mm | 0 | 1 | 2 | 0 | 0 | 0 | 0 | 0 | 0 |
| Lf | mm | 10 | 9 | 8 | 10 | 10 | 10 | 10 | 10 | 10 |
| Lr/Lf | — | 0 | 0.11 | 0.25 | 0 | 0 | 0 | 0 | 0 | 0 |
| Maximum length of cross-sectional opening portion | μm | 4200 | 3600 | 3100 | 4500 | 4100 | 4400 | 4200 | 4500 | 4300 |
| Average pore diameter | μm | 58 | 58 | 58 | 60 | 62 | 52 | 60 | 53 | 55 |
| Specific gravity of microporous portion | g/cm$^3$ | 0.4 | 0.4 | 0.4 | 0.5 | 0.4 | 0.4 | 0.4 | 0.5 | 0.5 |
| Specific gravity of fiber-reinforced composite material | g/cm$^3$ | 0.1 | 0.1 | 0.1 | 0.1 | 0.1 | 0.1 | 0.1 | 0.2 | 0.1 |
| Resin (A) | — | PP | PP | PP | PC | PP | PP | PA | PPS | PEEK |
| Content of reinforcing fiber | parts by mass | 50 | 50 | 50 | 50 | 50 | 50 | 50 | 50 | 50 |
| Thickness of fiber-reinforced composite material | mm | 2.8 | 2.8 | 2.8 | 2.2 | 2.8 | 4.8 | 2.8 | 2.8 | 2.8 |
| Deflection under load | — | good | good | fair | good | good | good | good | good | good |

TABLE 2

|  |  | Comparative Example 1 | Comparative Example 2 | Comparative Example 3 | Comparative Example 4 | Comparative Example 5 |
|---|---|---|---|---|---|---|
| Fold angle | ° | 110 | — | — | — | — |
| Lr | mm | 5 | — | — | — | — |
| Lf | mm | 6 | — | — | — | — |
| Lr/Lf | — | 0.83 | — | — | — | — |
| Maximum length of cross-sectional opening portion | μm | 5000 | — | — | — | — |
| Average pore diameter | μm | 63 | 70 | 64 | 55 | 62 |
| Specific gravity of microporous portion | g/cm$^3$ | 0.4 | 0.4 | 0.4 | 0.5 | 0.5 |
| Specific gravity of fiber-reinforced composite material | g/cm$^3$ | 0.1 | 0.4 | 0.4 | 0.5 | 0.5 |
| Resin (A) | — | — | PP | PP | PA | PPS | PEEK |
| Content of reinforcing fiber | parts by mass | 50 | 50 | 50 | 50 | 50 |
| Thickness of fiber-reinforced composite material | mm | 2.8 | 0.9 | 0.8 | 0.4 | 0.6 |
| Deflection under load | — | bad | bad | bad | bad | bad |

The fiber-reinforced composite material obtained by molding the prepreg of the present invention can be preferably applied to applications such as aircraft structural members, wind turbine blades, automobile structural members, IC trays, and housings of notebook computers.

DESCRIPTION OF REFERENCE SIGNS

1: Prepreg
2: Resin (A)
3: Reinforcing fiber or reinforced fiber substrate (B)
31: Fold of reinforcing fiber or fold of reinforced fiber substrate (B)
31A: Fold of reinforced fiber substrate (B) (first fold)
31B: Fold of reinforced fiber substrate (B) (second fold)
31C: Fold of reinforced fiber substrate (B) (third fold)
31D: Fold of reinforced fiber substrate (B) (fourth fold)
Lr: Distance between first fold and mostly adjacent fold (fourth fold)
Lf: Distance between first fold and fold (fourth fold) mostly adjacent to first fold along reinforced fiber substrate (B)
θ: Fold angle
4: Space having substantially triangular cross section (coarse pore portion)
5: Microporous structure
6: A pair of adjacent folds of reinforced fiber substrate (B)
7: Constituent ratio of a pair of adjacent folds viewed from front and back surfaces of folded substrate
8: Apex of zigzag structure
9: Repeat spacing between apexes of zigzag structure
10: Space having substantially trapezoidal cross section (coarse pore portion)
11: Microporous portion

The invention claimed is:

1. A prepreg comprising a planar reinforced fiber substrate (B) impregnated with a resin (A),
wherein the planar reinforced fiber substrate (B) exists in a folded state having a plurality of folds with a fold angle of 0° or more and less than 90° in the prepreg,
wherein the resin (A) is disposed in a space defined by the plurality of folds by the folded planar reinforced fiber substrate (B).

2. The prepreg according to claim 1, wherein when an optionally selected fold is defined as a first fold in the cross section orthogonal to a direction of the fold, and counting in an order such that a fold adjacent to the first fold is a second fold, a fold further adjacent to the second fold is a third fold, and a fold further adjacent to the third fold is a fourth fold, the planar reinforced fiber substrate (B) is folded in a manner such that the first fold and the fourth fold or any of folds after the fourth fold are adjacent.

3. The prepreg according to claim 2, wherein when in a cross section orthogonal to a direction of the fold, Lr is a linear distance between the first fold and the fourth fold or any of folds after the fourth fold adjacent to the first fold, and Lf is a distance connected along the planar reinforced fiber substrate (B) from the first fold to a fold after the fourth fold mostly adjacent to the first fold, the planar reinforced fiber substrate (B) has Lr/Lf of 0.3 or less and Lf of 1 mm or more and 200 mm or less.

4. The prepreg according to claim 2, wherein the planar reinforced fiber substrate (B) exists in a folded state including a Z-shaped structure having the first fold and the second fold adjacent to the first fold as bending points in a cross section orthogonal to a direction of the fold.

5. The prepreg according to claim 4, wherein the planar reinforced fiber substrate (B) exists in a folded state including the Z-shaped structure with a continuous structure in a cross section orthogonal to a direction of the fold.

6. The prepreg according to claim 2, wherein the planar reinforced fiber substrate (B) exists in a folded state including a substantially triangular structure formed by bringing the first fold and the fourth fold adjacent to each other.

7. The prepreg according to claim 6, wherein the planar reinforced fiber substrate (B) has a continuous folded structure with a reversed folded structure including a substantially triangular structure in a cross section orthogonal to a direction of the fold.

8. The prepreg according to claim 1, wherein the planar reinforced fiber substrate (B) has a regular folded structure over the entire prepreg.

9. The prepreg according to claim 1, wherein a resin (A) is a thermoplastic resin.

10. A preform comprising the prepreg according to claim 1.

11. A fiber-reinforced composite material comprising the formed prepreg according to claim 1.

12. A sandwich structure comprising the fiber-reinforced composite material according to claim 11 sandwiched between skin layers.

13. The prepreg according to claim 1, wherein the resin (A) is selected from the group consisting of polypropylene, polyarylene sulfide and polyarylene ether ketone.

14. The prepreg according to claim 1, wherein the planar reinforced fiber substrate (B) contains carbon fibers having a circular cross section.

15. A fiber-reinforced composite material comprising the formed preform according to claim 10.

16. A sandwich structure comprising the fiber-reinforced composite material according to claim 15 sandwiched between skin layers.

17. A method for producing the prepreg according to claim 1 comprising in this order:
Step [1]: a step of folding the planar reinforced fiber substrate (B) into a folded state having a plurality of folds with a fold angle of 0° or more and less than 90°; and
Step [2]: a step of combining the resin (A) with the folded planar reinforced fiber substrate (B).

18. A method for producing a fiber-reinforced composite material, the method comprising heating the prepreg according to claim 1 or a preform comprising a laminate comprising a plurality of prepregs according to claim 1 to a temperature or more at which the resin (A) is melted or softened, and molding.

* * * * *